US010882588B2

(12) United States Patent
Kreischer

(10) Patent No.: US 10,882,588 B2
(45) Date of Patent: Jan. 5, 2021

(54) RETRACTABLE DECK PIN

(71) Applicant: Tugpins B.V., Schiedam (NL)

(72) Inventor: Johannes Bernardus Gerardus Kreischer, Schiedam (NL)

(73) Assignee: Tugpins B.V., Schiedam (NL)

( * ) Notice: Subject to any disclaimer, the term of this patent is extended or adjusted under 35 U.S.C. 154(b) by 72 days.

(21) Appl. No.: 16/341,608

(22) PCT Filed: Oct. 12, 2017

(86) PCT No.: PCT/NL2017/050667
§ 371 (c)(1),
(2) Date: Apr. 12, 2019

(87) PCT Pub. No.: WO2018/070870
PCT Pub. Date: Apr. 19, 2018

(65) Prior Publication Data
US 2020/0122811 A1    Apr. 23, 2020

(30) Foreign Application Priority Data

Oct. 14, 2016 (NL) .................................... 2017623

(51) Int. Cl.
*B63B 21/06*    (2006.01)
*B63B 21/14*    (2006.01)
(Continued)

(52) U.S. Cl.
CPC .............. *B63B 21/06* (2013.01); *B63B 21/14* (2013.01); *B63B 21/56* (2013.01); *F16J 15/324* (2013.01)

(58) Field of Classification Search
CPC ......... B63B 21/06; B63B 21/14; B63B 21/56; F16J 15/324
See application file for complete search history.

(56) References Cited

U.S. PATENT DOCUMENTS

| 4,603,649 A | 8/1986 | Hystad |
| 5,655,232 A * | 8/1997 | Buckwalter ............... E04H 4/12 |
| | | 137/403 |

(Continued)

FOREIGN PATENT DOCUMENTS

| GB | 2491197 A | 11/2012 |
| WO | 2008/013845 A2 | 1/2008 |
| WO | 2013/077742 A1 | 5/2013 |

OTHER PUBLICATIONS

International Search Report and Written Opinion for corresponding International Application No. PCT/NL2017/050667, dated Nov. 17, 2017, 12 pages.

*Primary Examiner* — Stephen P Avila
(74) *Attorney, Agent, or Firm* — Hoffmann & Baron, LLP

(57) ABSTRACT

A retractable deck pin for cooperating with a boat line includes a cylindrical pin body which is axially movable in a pin guidance by an underdeck positioned actuator. A seal element is positioned in a clearance for sealing the pin body with respect to the pin guidance. The retractable deck pin is improved by providing a reservoir filled with an oil volume. The reservoir which is positioned under the pin guidance has a reservoir opening for receiving the pin body in the contained liquid volume. An air inlet is provided with a non-return air valve. When moving the pin base into the liquid volume, an air volume above the liquid volume will get pressurised. An airflow escapes from the reservoir via the clearance to the ambient. The air flow through the clearance counteracts a possible incoming flow of leaking.

11 Claims, 1 Drawing Sheet

(51) Int. Cl.
*B63B 21/56* (2006.01)
*F16J 15/324* (2016.01)

(56) References Cited

U.S. PATENT DOCUMENTS 5,983,820 A 11/1999 Whitley
6,588,355 B1 7/2003 Whitley, II et al.

* cited by examiner

RETRACTABLE DECK PIN

CROSS-REFERENCE TO RELATED APPLICATIONS

The present application is a U.S. National Phase filing of International Application No. PCT/NL2017/050667, filed on Oct. 12, 2017, designating the United States of America, claiming priority to and the benefit of the Dutch application NL 2017623, filed Oct. 14, 2016, the contents of all of which are incorporated by reference herein in its entirety.

FIELD OF THE INVENTION

The present invention relates to a retractable deck pin. The retractable deck pin is a marine pin which is mountable at a deck of a vessel and which is arranged to cooperate with a boat line, e.g. a rope or a chain. The deck pin can be elevated above a deck level of a vessel and retracted again. A retractable deck pin may be arranged as a tow line guide pin, an anchoring point or a retractable cleat.

BACKGROUND OF THE INVENTION

U.S. Pat. No. 4,603,649 discloses a retractable tow line guide pin at a stern of a tugboat or supply boat which is made to be elevated from or to be retracted into the deck of the vessel. The retractable guide pin comprises a cylindrical pin body which has a pin top and a pin base. The pin top is provided with a projecting locking member for closing an opening between two side-by-side positioned guide pins. In use, the locking members prevent a boat line to escape from the guide pins. The pin bodies with locking members are rotatable to close the opening in between two guide pins. Additionally, the pin body is axially movable to retract or elevate the pin top with respect to the deck of the vessel. To allow the movements of the in body, the pin body is guided by a pin guidance which circumvents the pin body. The axial movement of the pin body is controlled by an hydraulic cylinder. The hydraulic cylinder is positioned below the deck.

A drawback of the disclosed retractable tow line guide pin is that seawater may leak below deck level through a clearance in between the pin body and the pin guidance. Leaking seawater passes along underdeck components which causes corrosion and limits an operational lifetime of the guide pin.

U.S. Pat. No. 6,588,355 discloses a retractable cleat including an underdeck retainer. The retainer is shaped to allow received leaked seawater to be drained therefrom. The shape of the retainer allows for a complete drainage of an interior to reduce a possible corrosion of components.

WO2013/077742 discloses a similar solution regarding an anchoring point in a helicopter deck. The anchoring point contains a fastener which is retractable into a housing. A bottom portion of the housing is provided with a drainage opening leading into a discharge conduit which is arranged to lead fluid away from the housing. Accumulation of fluid in the housing is prevented. A penetration fluid into the housing is drained away in order to avoid corrosion and freezing of components of the anchoring point.

U.S. Pat. No. 5,983,820 discloses a retractable cleat including an improved seal. The seal is arranged to prevent water from seeping into tubes of a base. The seal is configured to form a watertight seal about a post depending from a head of the retractable cleat. The seal is press-fit within a seat of the base, such that an exterior surface and a bottom surface of the seal is in substantial contact with an interior wall and step wall of the seat. The seal is an annularly shaped seal having an interior surface for closely receiving the post, but being configured to permit the post to slide longitudinally.

A drawback of this disclosed seal is that this solution does not satisfy. To much seawater still leaks and passes the seal of the retractable cleat which causes problems of corrosion.

The general object of the present invention is to at least partially eliminate the above mentioned drawbacks and/or to provide a useable alternative. More specific, it is an object of the invention to provide a retractable deck pin which reduces a leakage of seawater through a deck of a vessel.

SUMMARY OF THE INVENTION

This object is achieved by a retractable deck pin according to the present invention.

According to the invention, a retractable deck pin is provided which deck pin is arranged for cooperating with a boat line, like a rope or a chain. In an embodiment, the retractable deck pin is a tow line guide pin which is arranged for guiding the boat line. In an embodiment, the retractable deck pin may be a retractable cleat or an anchoring point.

The retractable deck pin comprises a cylindrical pin body which defines an axial axis. The pin body is arranged in an upper region of the deck pin. The pin body has a pin base and a pin top. The pin top is configured to cooperate with the boat line.

The retractable deck pin comprises a pin guidance for axially guiding pin body. The pin guidance allows the pin body to move up and down in the axial direction. The pin guidance has a cylindrical inner space for receiving the pin body. The pin body is axially movable inside the inner space. The pin base is received in the inner space.

The retractable deck pin comprises at least one seal element. The seal element is positioned in the inner space for sealing the pin body with respect to the pin guidance. The seal element is a ring shaped and seals a clearance in between the pin body and the pin guidance.

The retractable deck pin comprises an actuator, in particular a hydraulic cylinder. The actuator is positioned in a lower region of the deck pin. The actuator is connected to the pin body for axially moving the pin body with respect to the pin guidance.

According to the invention, the retractable deck pin is improved by providing a liquid reservoir. The reservoir is arranged for containing a liquid volume. Preferably, the liquid volume is an oil volume. The reservoir is positioned in the lower region of the deck pin. The reservoir is arranged for enclosing underdeck positioned components of the deck pin. The reservoir comprises a reservoir wall which circumvents the actuator. The reservoir comprises a reservoir bottom. The reservoir bottom is positioned below the pin guidance and below the pin base. The reservoir has a reservoir opening for receiving the pin base in the contained liquid volume.

Further, the deck pin includes an air inlet which is provided with an air valve. Preferably, the air inlet is a passageway provided in the reservoir wall. Alternatively, the air inlet may be formed by a passageway in a pin guidance wall. Preferably, the air inlet provides a passageway in between an ambient environment and a reservoir inner space.

Preferably, the air valve is a pneumatic non-return valve, or so called pneumatic one-way valve. The air valve is arranged to allow an air flow into the reservoir, and to block an airflow out of the reservoir. Alternatively, the one-way valve may be an operatable valve.

In operation of the retractable deck pin, the pin base is axially moved with respect to the contained liquid volume in the reservoir. When moving the pin base into the liquid volume, a liquid level of the contained liquid volume will rise and an air volume above the liquid volume will get pressurised. The air valve prevents an escape of an air via the inlet of the reservoir. As a consequence, an airflow can only escape from the reservoir via the clearance in between the pin body and the pin guidance. Advantageously, the upwardly directed airflow through the clearance in between the pin body in the pin guidance counteracts a possible incoming flow of leaking seawater which may move downwardly together with the pin body.

Preferably, the reservoir is arranged for completely enclosing the actuator of the deck pin. Preferably, the reservoir bottom is positioned below an actuator housing of the actuator, such that the actuator housing is completely received in the reservoir. The reservoir wall or reservoir bottom may be provided with at least one port to allow a passage of an actuator conduit to the actuator housing for operating the actuator. Advantageously, a complete enclosure of the actuator by the reservoir allows a simple structure in which additional sealing items can be avoided. In an alternative embodiment, the actuator housing may extend through the reservoir bottom.

The at least one seal element in the clearance in between the pin body and the pin guidance is arranged to provide a watertight seal. In the prior art, applied seal elements are arranged to provide a watertight sealing during a rotational movement of the pin body. It has appeared that these watertight seal elements are especially vulnerable for a seawater leakage during the axial movement of the pin body. Damages at an outer surface of the pin body, like crashes and grooves, which may be caused by a boat line impact increase a seawater leakage through the clearance between the pin body and pin guidance along the at least one seal element. Advantageously, the counter acting airflow during a lowering of the pin body blows leaking seawater backwards along the pin body in an upwards direction towards the pin top to prevent the seawater arriving under the deck. Advantageously, the presence of the air inlet allows a supply of air when the pin body moves upward and prevents a sucking of an airflow along the pin body in a downwards direction which prevents a sucking of seawater through the clearance. Herewith, the retractable deck pin according to the invention provides an improvement in a resistance against a seawater leakage.

In an embodiment of the retractable deck pin according to the invention, the at least one seal element is a one-way airtight seal element. The seal element is positioned in the clearance in between the pin body and the pin guidance, such that an air flow is permitted in an upwards direction along the pin body and prevented in a downwards direction along the pin body. An example of such a one-way airtight seal element is a seal element according to DIN 3760/3761, e.g a rubberised metal cased open seal element with seal and dust lip. When the pin body moves upward, a temporary under-pressure will be generated in the reservoir. The one-way airtight capacity of the seal element advantageously contributes to prevent a false airflow from the ambient through the clearance in between the pin body and the pin guidance. In preventing such a false airflow, it is prevented that also seawater is sucked together with ambient air along an outer circumference of the pin body into the reservoir. Hence, the one-way airtight capacity of the seal element supports a sucking of ambient air only through the air inlet.

In particular, the one-way airtight seal element is an asymmetric seal element which asymmetric shape is formed by an axially extending sealing lip. In particular, the seal element is a metal cased seal element in which the seal element includes a metal case body at an outer circumference. More in particular, the seal element is an open metal cased seal element in which the seal element includes an axially open metal case body at an outer circumference. The seal element comprises at an inner circumference a seal lip which provides the airtight capacity. Preferably, the seal element comprises at an inner circumference a seal lip and a dust lip. Preferably, the lubrication of the at least one seal element is carried out by greasing which may further improve the airtight capacity of the seal element.

In an embodiment of the retractable deck pin according to the invention, the at least one seal element is a lower seal element. The lower seal element is positioned at a lower region of the pin guidance. The lower seal element is positioned, such that in operation of the deck pin only an outer circumferential surface of the pin base contacts the seal element. The outer circumferential surface of the pin base is a surface which remains free from boat line impacts and for that reason may remain free from damage. The outer circumferential surface of the pin base may remain a smooth surface which contributes to a proper sealing. The smooth outer surface of the pin base is suitable as a counter surface for the airtight seal element.

In an embodiment of the retractable deck pin according to the invention, the deck pin comprises at least a lower and an upper seal element, wherein the lower seal element is a one-way airtight seal element. All seal elements may be one-way airtight seal elements, but preferably only the lower seal element is a one-way airtight seal element. In an embodiment, only the lower seal element is a one-way airtight seal element, while each remaining seal element is a watertight seal element without an extending sealing lip. Such a watertight seal element may include a ring case body at an outer circumference and a symmetric ring seal at an inner circumference of the case. The ring seal may have a circular or block shaped cross-section.

In an embodiment of the retractable deck pin, the reservoir is formed by separately mountable reservoir segments. In particular, the reservoir wall is formed by a stack of ring-shaped reservoir wall segments. Advantageously, the reservoir segments allow an installation of the reservoir in narrow under deck spaces. Especially, tugboats often provide only a small mounting space underneath their deck.

In an embodiment of the retractable deck pin, the reservoir is formed by a reservoir bottom segment and a stack of reservoir wall segments. Preferably, the reservoir wall has a height which corresponds with a mounting height of under deck components of the deck pin, such that the components can be fully enclosed by the reservoir.

Further, the invention relates to a deck pin arrangement, wherein the arrangement includes a winch for handling a line. Such arrangements can be used as an active tool during anchor handling in anchoring of offshore installations and also on tugboats and at other tugging operations. Particularly boat lines, like large-diameter ropes or hawsers, are to be guided on all sides in a guide passage which, however, must be capable of being opened for insertion and removal of this rope from the passage. It is particularly advantageous on board ship, especially as a guide at the stern of a tug. In such an application the guide arrangement is mounted midships at the stern of the tug in the region of the bulwark.

Further, the invention relates to a guide pin arrangement which includes at least two, in particular three retractable guide pins. In particular, the guide pin arrangement is a tow line guide pin arrangement to be installed on board of a tugboat, a so-called tugboat tow line guide pin arrangement.

In an embodiment of the tugboat tow line guide pin arrangement, the guide pin arrangement comprises a pair of side-by-side positioned guide pins, which guide pin each includes a pin body with a lock element positioned at an end face of a pin top, wherein the lock element is movable to close an opening in between the two guide pins. The tugboat tow line guide pin arrangement includes a pair of lock elements, also called "flaps",—as vertical stoppers—on top of the pin bodies. Generally, the tugboat tow line guide pin arrangement is positioned at a stern of the vessel. Each guide pin is pivotable to permit the lock elements to be brought by rotation into a locking position, such that a towline is captured in between the guide pins and lock elements. A vertical movement of the towline or similar means is limited by the lock elements.

Further, the invention relates to a vessel, in particular a tugboat comprising a deck and at least one retractable deck pin according to the invention.

Further, the invention relates to a method for operating a retractable deck pin comprising the steps of providing a deck pin according to the invention; filling the reservoir of the deck pin with a liquid volume; actuating an upwards or downwards movement of the pin body of the deck pin.

Further, the invention relates to a method of revising an existing retractable deck pin to reduce seawater leakage. The revising method comprises the step of mounting a reservoir over under deck positioned components. The reservoir is mounted below the pin guidance and pin base of the deck pin. The mounted reservoir includes an air inlet at the upper region of the reservoir wall, which air inlet is provided with an air valve.

BRIEF DESCRIPTION OF THE DRAWINGS

The invention will be explained in more detail with reference to the appended drawings. The drawings show a practical embodiment according to the invention, which may not be interpreted as limiting the scope of the invention. Specific features may also be considered apart from the shown embodiment and may be taken into account in a broader context as a delimiting feature, not only for the shown embodiment but as a common feature for all embodiments falling within the scope of the appended claims, in which:

DETAILED DESCRIPTION OF THE INVENTION

Figure 1:
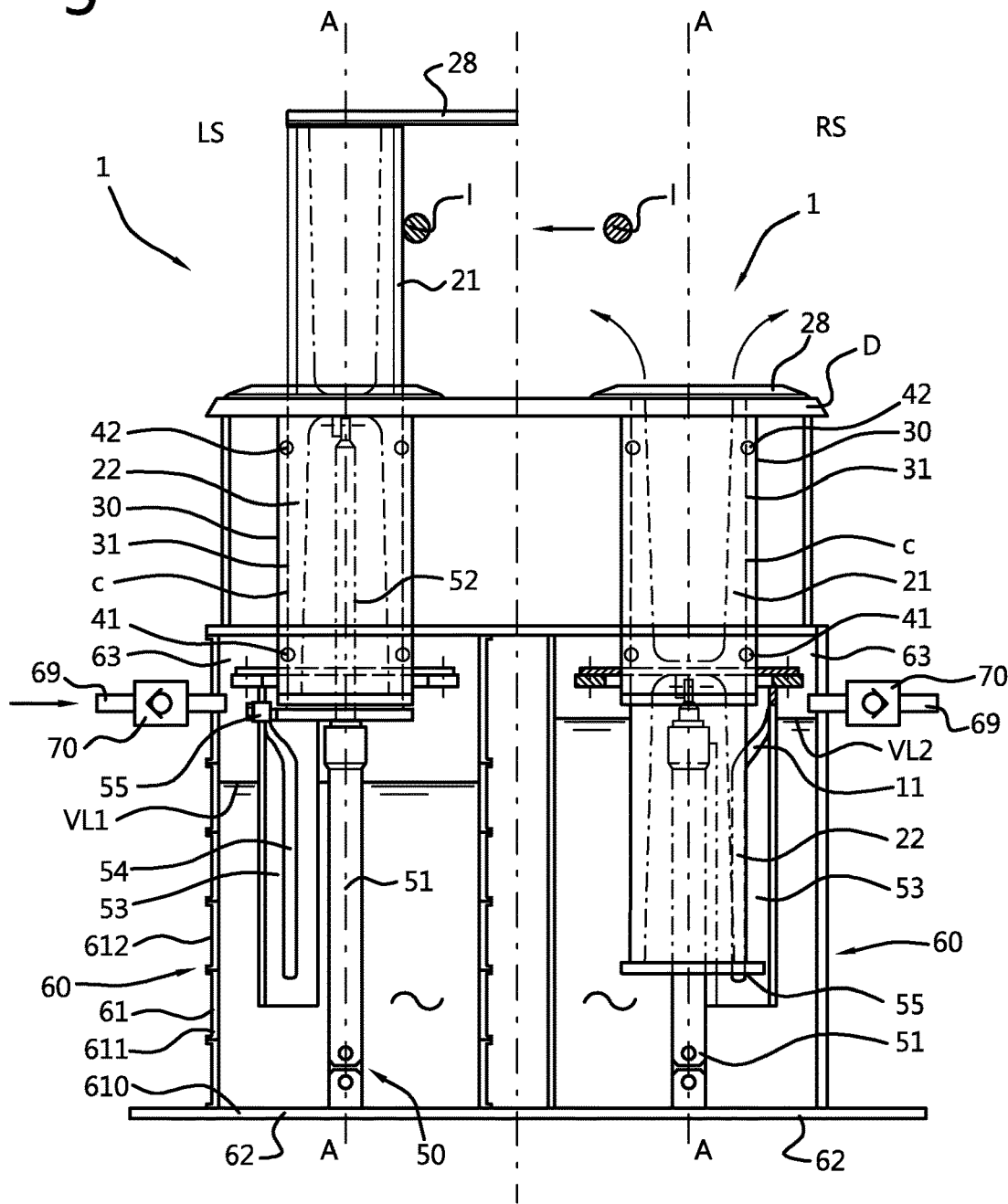
FIG. 1 shows in a cross sectional view a pair of two retractable deck pins according to the invention, in which a left sided part of FIG. 1 shows a deck pin in an elevated position and a right side part of FIG. 1 shows a deck pin in a retracted position.

Identical reference signs are used in the drawing to indicate identical or functionally similar components.

To facilitate comprehension of the description and of the claims the words vertical, horizontal, axial, longitudinal, cross-sectional—with reference to gravity—are used in a non-limiting way.

FIG. 1 shows a cross sectional view of a pair of retractable deck pins 1. The retractable deck pin is a marine pin which is arranged for operation on board of a vessel. Here, the illustrated retractable deck pin is embodied as a tow line guide pin. In a left-sided part LS, FIG. 1 shows a retractable deck pin in an elevated position and in a right sided part RS, FIG. 1 shows a retractable deck pin in a retracted position. In the elevated position, the deck pin is operational, e.g. for guiding a line 1. In the retracted position, the deck pin is stored in a deck D of a vessel.

Each deck pin 1 extends along an axial axis A-A. The deck pin 1 comprises a pin body 20. The pin body 20 defines the axial axis A-A. The pin body 20 is cylindrical and has a pin top 21 and pin base 22. The pin top 21 is provided with a lock element 28. The lock element 28, also called a flipper, is arranged for closing and opening in between two neighbouring guide pins. The lock element 28 is oblong and mounted at a proximal side at an end face of the pin body 20. The lock element 28 has a free distal end. In a closed position, the lock element 28 is rotated from an initial position, such that two distal ends of two neighbouring guide pins contact each other to prevent a tow line 1 from escaping away from the guide pin.

The pin body 20 is positioned in a cylindrical inner space 31 of a pin guidance 30. The pin body 20 is axially movable with respect to the pin guidance 30. The pin guidance 30 is arranged for guiding the pin body 20. A clearance in between the pin body 20 and the inner space 31 is provided to allow an axial movement of the pin body 20.

At least one seal element 40 is provided to seal the clearance. Here, a lower seal element 41 is positioned at a lower region of the inner space 31 and an upper seal element 42 is provided at an upper region of the inner space 31. The lower seal element 41 is substantially in contact with an outer circumferential surface of the pin base 22, while the upper seal element 42 is substantially in contact with an outer circumferential surface of the pin top 21. The outer circumferential surface of the pin top 21 is relatively more vulnerable to damages because this surface is in operation in contact with the boat line 1. Scratching of the line impairs the outer circumferential surface of the pin top 21. The circumferential outer surface of the pin base 22 may remain free of damages and provide a smooth surface which contributes to a proper sealing.

The deck pin 1 further comprises a pin actuator 50. Here, the actuator is a hydraulic cylinder including a cylinder housing 51 and a movable piston rod 52. The cylinder housing 51 is stationary connected to the deck D. The piston rod 52 has a free end which is connected to the pin body 20.

To force the pin body 20 to rotate, the pin actuator 50 may comprise a tubular plate shaped segment 53 which includes a guide groove 54 extending in the axial direction and which groove cooperates with a roller stud 55. The roller stud 55 is connected to the pin base 22. The guide groove 54 follows a straight line over a substantial portion of his length, for example 60 cm or more, while the groove is laterally deflected over the remaining 20 cm of its length, assuming the pin body can be moved a total distance of 80 cm. The deflected part of the groove is of sufficient angle of inclination and length to cause the pin body 20, by means of the roller stud 55 which follows the groove configuration as the pin body is elevated, to pivot about 90° from an initial position in which the locking element is 28 is flush with the deck D shown in the right sided view RS to the closed position of the locking element 28 shown in the left-sided view LS of FIG. 1.

The deck pin 1 according to the invention comprises a reservoir 60 for containing a liquid volume VL, in particular an oil volume. The reservoir is filled with liquid to a certain liquid volume level VL1, VL2. The reservoir comprises a reservoir wall 61 which circumvents the actuator 50. The reservoir comprises a reservoir bottom 62. The reservoir bottom 62 is positioned below the pin guidance 30 and pin base 22. Here, the cylinder housing 51 is fixed to the reservoir bottom 62. The reservoir 60 is open at an upper region for receiving the pin base 22. The reservoir wall 61 forms the reservoir opening 63.

As illustrated in the left-sided view LS of FIG. 1, the reservoir 60 is mounted by a plurality of reservoir segments 610,611,612 etc. Reservoir segments are stacked to form the reservoir wall 61. A reservoir bottom segment 610 forms the reservoir bottom 62. Ring-shaped first, second, third etc. reservoir segments form the reservoir wall 61. The reservoir segments may each have a mounting flange for mounting the reservoir segments to each other. Advantageously, the reservoir out of segments allow an installation of the reservoir in narrow spaces.

The reservoir 60 comprises an air inlet 69 to allow an air flow to enter the reservoir. The air inlet 69 is positioned above a level of the liquid volume VL2 when the pin body is in the retracted position. Here, as illustrated, the air inlet 69 is positioned at the reservoir wall 61. Alternatively, the air inlet may be positioned at the pin guidance in which the air inlet is preferably positioned below the lower seal element 41. The air inlet may be formed by a bore through a pin guidance wall, in which the bore provides a passageway in between the ambient air and a reservoir inner space.

The air inlet 69 is provided with an air valve 70. The air valve 70 is a non-return valve which allows an air flow to enter the reservoir, but which non-return valve prevents an air flow out of the reservoir 60. Herewith, the non-return valve 70 allows an air flow to enter the reservoir 60 when the pin body 20 moves upwards, but prevents an air flow out of the reservoir 60 when the pin body 20 moves downwards. When the pin body 20 moves downwards, pressurised air can only escape via a clearance 'c' in between the pin body and the pin guidance. The air flow through the clearance 'c' away from the reservoir prevents seawater from passing through the clearance in an opposite direction to the reservoir. Herewith, advantageously, a reduction of seawater leakage is provided.

Figure 2:
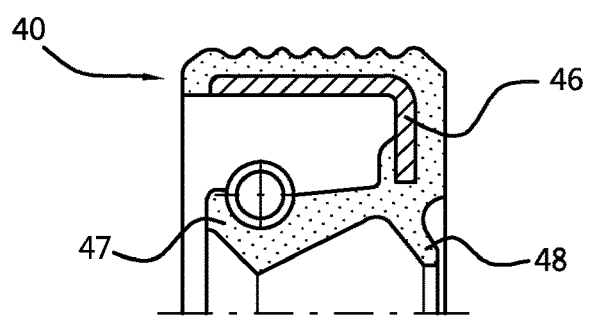
FIG. 2 shows a cross sectional view of a one-way airtight seal element including a axial extending seal lip.

FIG. 2 shows a cross sectional view of a one-way airtight seal element 40. The seal element has a case body 46 which forms an outer circumference of the seal element. Preferably, the case body 46 includes a metal case. The metal case has an L-shape in cross-section. The case body 46 is open at one side. The open side of the case body 46 may be filled with grease to increase an operational lifetime of the seal element.

The one-way airtight seal element has an asymmetric shape. The asymmetric shape is formed by an axial extending seal lip 47. The seal lip is positioned at an inner circumference of the seal element. The seal lip 47 provides the airtight capacity. In the deck pin, the seal lip 47 of the seal element 40 is extending in upwards direction towards the pin top 21. An airflow originating from the reservoir 60 may lift the seal lip 47 from it counter surface, while an under pressure in the reservoir will attract the seal lip 47 to the counter surface. In operation, the seal lip 47 sticks to a counter surface formed by the outer circumferential surface of the pin body 20. Preferably, the seal element further comprises a dust lip at an inner circumference of the seal element. The dust lip 48 is positioned aside the seal lip 47.

Thus, the invention provides a retractable deck pin for cooperating with a boat line including a cylindrical pin body which is axially movable in a pin guidance by an underdeck positioned actuator. A seal element is positioned in a clearance for sealing the pin body with respect to the pin guidance. The retractable deck pin is improved by providing a reservoir filled with an oil volume. The reservoir is arranged for enclosing underdeck positioned components of the deck pin and positioned below the pin guidance. The reservoir has a reservoir opening for receiving the pin body in the contained liquid volume. An air inlet is provided with a non-return air valve. When moving the pin base into the liquid volume, a liquid level of the contained liquid volume will rise and an air volume above the liquid volume will get pressurised. The air valve prevents an escape of an air via the inlet of the reservoir. An airflow escapes from the reservoir via the clearance to the ambient. The air flow through the clearance counteracts a possible incoming flow of leaking.

It is noted that the term "comprising" (and grammatical variations thereof) is used in this specification in the inclusive sense of "having" or "including", and not in the exclusive sense of "consisting only of".

The invention is disclosed with reference to embodiments of the retractable deck pin according to the invention. Reference is expressly made to the fact that, after reading the description, a person skilled in the art may wish to make changes or adaptations that are possible from a technical viewpoint, but that said changes or adaptations do not fall outside the scope of protection of the invention as defined in the attached claims. The person skilled in the art must understand that it is possible to make various adaptations from a technical viewpoint and to replace elements with equivalents without thereby departing from the essence of the invention. It is in particular possible to make modifications, which fall within the definition according to the attached claims, with respect to the illustrated embodiments which do not depart from the essence of the invention and thus remain within the teaching of the invention. The invention is therefore not restricted to the illustrated and described embodiments, but the scope of protection of the invention will cover all embodiments which fall within the definition of the attached claims.

REFERENCE SIGNS LIST 1 deck pin
20 pin body
21 pin top
22 pin base
28 lock element
30 pin guidance
31 inner space
40 seal element
41 lower seal element
42 upper seal element
46 case body
47 seal lip
48 dust lip
50 pin actuator
51 cylinder housing
52 piston rod
53 tubular segment
54 guide groove
55 roller stud
60 reservoir
61 reservoir wall
610 reservoir bottom segment 611 first reservoir segment
612 second reservoir segment
62 reservoir bottom
63 reservoir opening
69 air inlet
70 air valve
c clearance
VL liquid volume
VL1, VL2 level of liquid volume

The invention claimed is:

1. A retractable deck pin for cooperating with a boat line, comprising:
   a cylindrical pin body having a pin base and a pin top which pin top is configured to cooperate with the boat line, which pin body is arranged in an upper region of the deck pin and which pin body defines an axial axis;
   a pin guidance for axially guiding the pin body, wherein the pin guidance has a cylindrical inner space for receiving the pin body;
   at least one seal element which is positioned in the inner space for sealing a clearance in between the pin body and the inner space of the pin guidance;
   an actuator connected to the pin body for axially moving the pin body with respect to the pin guidance, which actuator is positioned in a lower region of the deck pin;
   wherein the deck pin further comprises:
   a reservoir for containing a liquid volume which reservoir is positioned in the lower region of the deck pin, wherein the reservoir comprises a reservoir wall which reservoir wall circumvents the actuator, a reservoir bottom which is positioned under the pin guidance and pin base, and a reservoir opening for receiving the pin base; and
   an air inlet which air inlet includes an air valve which is arranged to allow an air flow into the reservoir and to block and airflow out of the reservoir, to allow that an increasing air pressure which occurs when lowering the pin body in the liquid volume of the reservoir causes an airflow through the clearance in between the pin body and the pin guidance which airflow counteracts a leakage of seawater through the clearance.

2. The deck pin according to claim 1, wherein the at least one seal element is a one-way airtight seal element which seal element is airtight in downwards direction.

3. The deck pin according to claim 2, wherein the one-way airtight seal element comprises an extending seal lip at an inner circumference of the seal element.

4. The deck pin according to claim 1, wherein the at least one seal element is a lower seal element which is positioned in a lower region of the pin guidance to allow that in operation, the lower seal element is in contact with an outer circumferential surface of the pin base.

5. The deck pin according to claim 2, wherein the deck pin comprises at least a lower and an upper seal element, wherein the lower seal element is a one-way airtight seal element.

6. The deck pin according to claim 5, wherein only the lower seal element is a one-way airtight seal element.

7. The deck pin according claim 1, wherein the reservoir is formed by a stack of a separately mountable reservoir segments.

8. The deck pin according to claim 7, wherein the reservoir wall is formed by a stack of ring-shaped reservoir wall segments.

9. A tugboat tow line guide pin arrangement, wherein the guide pin arrangement comprises a pair of side-by-side positioned guide pins, which guide pin each includes a pin body with a lock element positioned at an end face of a pin top, wherein the lock element is movable to close an opening in between the two guide pins, wherein the guide pin is arranged as a retractable deck pin according to any of the claim 1.

10. A vessel comprising a deck and at least one deck pin according claim 1.

11. A method of revising an existing retractable deck pin comprising a step of mounting a reservoir over underdeck situated components, which reservoir is positioned under the pin guidance and pin base in which the reservoir includes an air inlet at the upper region of the reservoir wall and which air inlet is provided with an air valve.

* * * * *